United States Patent
Tie et al.

(10) Patent No.: US 12,457,579 B2
(45) Date of Patent: Oct. 28, 2025

(54) PAGING INDICATION METHOD AND RELATED APPARATUS

(71) Applicant: HUAWEI TECHNOLOGIES CO., LTD., Shenzhen (CN)

(72) Inventors: Xiaolei Tie, Shanghai (CN); Wenwen Huang, Shanghai (CN); Han Zhou, Shanghai (CN); Zhanzhan Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 518 days.

(21) Appl. No.: 18/079,289

(22) Filed: Dec. 12, 2022

(65) Prior Publication Data

US 2023/0108137 A1 Apr. 6, 2023

Related U.S. Application Data

(63) Continuation of application No. PCT/CN2021/099658, filed on Jun. 11, 2021.

(30) Foreign Application Priority Data

Jun. 12, 2020 (CN) .......................... 202010534749.X

(51) Int. Cl.
*H04W 72/23* (2023.01)
*H04W 68/00* (2009.01)
*H04W 72/232* (2023.01)

(52) U.S. Cl.
CPC ....... *H04W 68/005* (2013.01); *H04W 72/232* (2023.01)

(58) Field of Classification Search
CPC ............................ H04W 68/00; H04W 72/23
See application file for complete search history.

(56) References Cited

U.S. PATENT DOCUMENTS

| | | | | |
|---|---|---|---|---|
| 2014/0066107 | A1* | 3/2014 | Schmidt | H04W 68/00 455/458 |
| 2018/0220400 | A1* | 8/2018 | Nogami | H04W 76/27 |
| 2022/0159669 | A1* | 5/2022 | Kim | H04W 52/0229 |

FOREIGN PATENT DOCUMENTS

| | | |
|---|---|---|
| CN | 109495925 A | 3/2019 |
| CN | 109842937 A | 6/2019 |
| CN | 110839273 A | 2/2020 |

(Continued)

OTHER PUBLICATIONS

ERICSSON: "Paging in DCI only", 3GPP Draft; R2-1804734, 2018-04-14, XP051428447, total 3 pages.

(Continued)

*Primary Examiner* — Michael T Vu
(74) *Attorney, Agent, or Firm* — HAUPTMAN HAM, LLP

(57) ABSTRACT

Embodiments of this application disclose a paging indication method and apparatus. The method includes: A terminal device receives downlink control information DCI from a network device, where the DCI indicates whether M terminal devices in N groups are paged, M is an integer greater than or equal to 1, and N is an integer greater than or equal to 1 and less than or equal to M; and when determining that a terminal device in a group in which the terminal device is located is paged, the terminal device receives a PDSCH scheduled by the DCI from the network device, where the PDSCH is used to carry a paging message.

20 Claims, 6 Drawing Sheets

(56) References Cited

FOREIGN PATENT DOCUMENTS

| | | |
|---|---|---|
| CN | 110972083 A | 4/2020 |
| CN | 111200870 A | 5/2020 |

OTHER PUBLICATIONS

3GPP Ts 38.214 V16.1.0 (2020-03), 3rd Generation Partnership Project, Technical Specification Group Radio Access Network, NR, Physical layer procedures for data (Release 16), total 151 pages.
Huawei et al.: "Finalization of NR Paging", 3GPP Draft; R1-1719373, 2017-11-18, pp. 1-7, XP051369282.
3GPP Ts 38.331 V16.0.0 (2020-03), 3rd Generation Partnership Project, Technical Specification Group Radio Access Network, NR, Radio Resource Control (RRC) protocol specification (Release 16), total 835 pages.
Zte et al.: "Paging design", 3GPP Draft; R1-1719344, 2017-11-18, XP051369273, total 11 pages.
Ntt Docomo et al.: "Remaining issues on Paging design for Nr", 3GPP Draft; R1-1800652, 2018-01-13, XP051384974, total 3 pages.
Extended European Search Report issued in corresponding European Application No. 21822475.6, dated Oct. 10, 2023, pp. 1-11.
Chinese Office Action issued in corresponding Chinese Application No. 202180026248.3, dated Feb. 28, 2024, pp. 1-17.
Chinese Office Action issued in corresponding Chinese Application No. 202180026248.3, dated Dec. 27, 2024, pp. 1-19.

\* cited by examiner

PAGING INDICATION METHOD AND RELATED APPARATUS

CROSS-REFERENCE TO RELATED APPLICATIONS

This application is a continuation of International Application No. PCT/CN2021/099658, filed on Jun. 11, 2021, which claims priority to Chinese Patent Application 202010534749.X, filed on Jun. 12, 2020. The aforementioned applications are hereby incorporated by reference in their entireties.

TECHNICAL FIELD

This application relates to the field of communication technologies, and in particular, to a paging indication method and a related apparatus.

BACKGROUND

The $3^{rd}$ generation partnership project (3GPP) standards organization is currently developing a protocol standard for a $5^{th}$ generation (5G) cellular mobile communication system, also referred to as new radio (NR). Compared with a long term evolution (LTE) system, the NR supports larger transmission bandwidth, more transceiver antenna arrays, a higher transmission rate, and a more flexible scheduling mechanism with a smaller granularity. Although the foregoing features of the NR provide more application scopes, power consumption burden of UE is extremely increased.

A terminal device (e.g. user equipment (UE)) usually shuts down a receiver and is in a low power consumption state when in an idle state (e.g. RRC_IDLE) or an inactive state (e.g. RRC_INACTIVE). A base station sends a paging message to the UE, and the UE is woken up from a low power consumption mode at intervals and attempts to receive the paging message, so that the UE is woken up. Regardless of whether a physical downlink shared channel (PDSCH) carries a paging message, the terminal device needs to perform decoding and parsing on the received PDSCH, resulting in a waste of power.

SUMMARY

Embodiments of this application provide a paging indication method and a related apparatus, to reduce power consumption.

According to a first aspect, an embodiment of this application provides a paging indication method, including: A terminal device receives downlink control information DCI from a network device, where the DCI indicates whether M terminal devices in N groups are paged, M is an integer greater than or equal to 1, and N is an integer greater than or equal to 1 and less than or equal to M; and when determining that a terminal device in a group in which the terminal device is located is paged, the terminal device receives a physical downlink shared channel PDSCH scheduled by the DCI from the network device, where the PDSCH is used to carry a paging message. Whether terminal devices in N groups are paged is indicated by using the DCI. After receiving the DCI, the terminal device may determine, based on the DCI, whether the group in which the terminal device is located is paged. If the group is paged, the PDSCH scheduled by the DCI is received, and is parsed to obtain the paging message. If the group is not paged, the received PDSCH does not need to be decoded to obtain the paging message, to reduce power consumption.

In a possible design, the DCI includes first indication information, the first indication information includes N bits, a bit location of an $i^{th}$ bit in the N bits indicates an $i^{th}$ group in the N groups, a bit status of the $i^{th}$ bit indicates whether the terminal device in the $i^{th}$ group is paged, and i is an integer greater than or equal to 1 and less than or equal to N. The N bits in the DCI indicate whether the terminal devices in the N groups are paged, so that signaling overheads can be reduced.

In another possible design, the DCI includes second indication information, and the second indication information indicates whether some or all of the N bits of the first indication information are carried in a short message field of the DCI. The short message field in the DCI is indicated to be reused, to carry the first indication information, so that signaling overheads can be reduced.

In another possible design, the DCI includes third indication information, and the third indication information indicates that the DCI does not include a short message field. That the DCI does not include the short message field is indicated to determine that the short message field is used to carry the first indication information, so that signaling overheads can be reduced.

In another possible design, the terminal device determines the N groups based on at least one of identifiers of the M terminal devices and time information, where the time information includes a time at which the DCI is sent or a paging occasion PO to which the DCI belongs. The N groups are determined by using the terminal identifiers and the time information, so that grouping randomness can be increased. Then, paging statuses of the terminal devices in the N groups are indicated by using the DCI, so that not only signaling overheads can be reduced, but also power consumption can be reduced.

In another possible design, the first indication information further includes K bits, the K bits indicate whether a specific channel state information reference signal CSI-RS exists in a first time period, and the first time period includes a discontinuous reception period next to a discontinuous reception period, and K is an integer greater than or equal to 1. Whether the specific channel state information reference signal exists in the first time period is indicated by using the DCI. After receiving the DCI, the terminal device may determine whether the specific channel state information reference signal exists in the first time period. If the specific channel state information reference signal exists in the first time period, the CSI-RS is received and parsed in the next discontinuous reception period. If the CSI-RS does not exist in the first time period, the CSI-RS does not need to be received and parsed, to reduce power consumption.

In another possible design, the terminal device receives configuration information from the network device, where the configuration information indicates that the first indication information further includes the K bits. Content included in the first indication information is indicated by using the configuration information, so that a time for parsing the DCI by UE can be reduced, and power consumption can be reduced.

According to a second aspect, an embodiment of this application provides a paging indication method, including: A network device sends downlink control information DCI to M terminal devices, where the M terminal devices correspond to N groups, DCI indicates whether a terminal device in at least one of the N groups is paged, M is an integer greater than or equal to 1, and N is an integer greater than or equal to 1 and less than or equal to M; and the network device sends a physical downlink shared channel PDSCH scheduled by the DCI to the terminal device in the at least one group, where the PDSCH is used to carry a paging message. Whether terminal devices in N groups are paged is indicated by using the DCI. After receiving the DCI, the terminal device may determine, based on the DCI, whether the group in which the terminal device is located is paged. If the group is paged, the PDSCH scheduled by the DCI is received, and is parsed to obtain the paging message. If the group is not paged, the received PDSCH does not need to be decoded to obtain the paging message, to reduce power consumption.

In a possible design, the DCI indicates that a terminal device other than the terminal device in the at least one of the N groups is not paged.

In another possible design, the DCI includes first indication information, the first indication information includes N bits, a bit location of an $i^{th}$ bit in the N bits indicates an $i^{th}$ group in the N groups, a bit status of the $i^{th}$ bit indicates whether the terminal device in the $i^{th}$ group is paged, and i is an integer greater than or equal to 1 and less than or equal to N. The N bits in the DCI indicate whether the terminal devices in the N groups are paged, so that signaling overheads can be reduced.

In another possible design, the DCI includes second indication information, and the second indication information indicates whether some or all of the N bits of the first indication information are carried in a short message field of the DCI. The short message field in the DCI is indicated to be reused, to carry the first indication information, so that signaling overheads can be reduced.

In another possible design, the DCI includes third indication information, and the third indication information indicates that the DCI does not include a short message field. That the DCI does not include the short message field is indicated to determine that the short message field is used to carry the first indication information, so that signaling overheads can be reduced.

In another possible design, the network device determines the N groups based on at least one of identifiers of the M terminal devices and time information, where the time information includes a time at which the DCI is sent or a paging occasion PO to which the DCI belongs. The N groups are determined by using the terminal identifiers and the time information, so that grouping randomness can be increased. Then, paging statuses of the terminal devices in the N groups are indicated by using the DCI, so that not only signaling overheads can be reduced, but also power consumption can be reduced.

In another possible design, the first indication information further includes K bits, the K bits indicate whether a specific channel state information reference signal CSI-RS exists in a first time period, and the first time period includes a discontinuous reception period next to a discontinuous reception period, and K is an integer greater than or equal to 1. Whether the specific channel state information reference signal exists in the first time period is indicated by using the DCI. After receiving the DCI, the terminal device may determine whether the specific channel state information reference signal exists in the first time period. If the specific channel state information reference signal exists in the first time period, the CSI-RS is received and parsed in the next discontinuous reception period. If the CSI-RS does not exist in the first time period, the CSI-RS does not need to be received and parsed, to reduce power consumption.

In another possible design, the network device sends configuration information to the M terminal devices, where the configuration information indicates that the first indication information further includes the K bits. Content included in the first indication information is indicated by using the configuration information, so that a time for parsing the DCI by UE can be reduced, and power consumption can be reduced.

According to a third aspect, an embodiment of this application provides a reference signal indication method, including: A terminal device receives DCI from a network device, where the DCI includes first indication information, the first indication information indicates whether a specific channel state information reference signal exists in a first time period, and the first time period includes a discontinuous reception period next to a discontinuous reception period; and when determining that the specific channel state information reference signal exists in the first time period, the terminal device receives the channel state information reference signal from the network device. Whether the specific channel state information reference signal exists in the first time period is indicated by using the DCI. After receiving the DCI, the terminal device may determine whether the specific channel state information reference signal exists in the first time period. If the specific channel state information reference signal exists in the first time period, the CSI-RS is received and parsed in the next discontinuous reception period. If the CSI-RS does not exist in the first time period, the CSI-RS does not need to be received and parsed, to reduce power consumption.

In a possible design, the terminal device receives configuration information from the network device, where the configuration information indicates that the DCI is used to carry the first indication information. That the DCI is used to carry the first indication information is indicated by using the configuration information, so that a time for parsing the DCI by the terminal device can be reduced, and power consumption can be reduced.

According to a fourth aspect, an embodiment of this application provides a reference signal indication method, including: A network device sends DCI to a terminal device, where the DCI includes first indication information, the first indication information indicates whether a specific channel state information reference signal exists in a first time period, and the first time period includes a discontinuous reception period next to a discontinuous reception period; and the network device sends the channel state information reference signal to the terminal device. Whether the specific channel state information reference signal exists in the first time period is indicated by using the DCI. After receiving the DCI, the terminal device may determine whether the specific channel state information reference signal exists in the first time period. If the specific channel state information reference signal exists in the first time period, the CSI-RS is received and parsed in the next discontinuous reception period. If the CSI-RS does not exist in the first time period, the CSI-RS does not need to be received and parsed, to reduce power consumption.

In a possible design, the network device sends configuration information to the terminal device, where the configuration information indicates that the DCI is used to carry the first indication information. That the DCI is used to carry the first indication information is indicated by using the configuration information, so that a time for parsing the DCI by the terminal device can be reduced, and power consumption can be reduced.

According to a fifth aspect, an embodiment of this application provides a communication apparatus. The communication apparatus is configured to implement a method and a function performed by the terminal device in the first aspect and the third aspect, the method and function are implemented by hardware/software, and the hardware/software includes modules corresponding to the foregoing function. The communication apparatus may be a terminal device or at least one chip that implements a function of the terminal device.

According to a sixth aspect, an embodiment of this application provides a communication apparatus. The communication apparatus is configured to implement a method and a function performed by the network device in the second aspect and the fourth aspect, and the method and function are implemented by hardware/software, and the hardware/software includes modules corresponding to the foregoing function. The communication apparatus may be a network device or at least one chip that implements a function of the network device.

According to a seventh aspect, an embodiment of this application provides a terminal device. The terminal device includes a processor, a memory, and a communication bus. The communication bus is configured to implement connection and communication between the processor and the memory. The processor executes a program stored in the memory, to implement steps in the first aspect and the third aspect.

According to an eighth aspect, an embodiment of this application provides a network device. The network device includes a processor, a memory, and a communication bus. The communication bus is configured to implement connection and communication between the processor and the memory. The processor executes a program stored in the memory, to implement steps in the second aspect and the fourth aspect.

According to a ninth aspect, an embodiment of this application provides a computer-readable storage medium. The computer-readable storage medium stores instructions. When the instructions are run on a computer, the computer is enabled to perform the methods in the foregoing aspects.

According to a tenth aspect, an embodiment of this application provides a computer program product including instructions. When the computer program product is run on a computer, the computer is enabled to perform the methods in the foregoing aspects.

According to an eleventh aspect, an embodiment of this application provides a chip, including a processor, configured to: invoke instructions from a memory and run the instructions stored in the memory, to enable a communication device in which the chip is mounted to perform the method in any one of the foregoing aspects.

According to a twelfth aspect, an embodiment of this application further provides another chip. The chip may be a chip in a terminal device or in a network device. The chip includes an input interface, an output interface, and a processing circuit. The input interface, the output interface, and the circuit are connected by using an internal connection path. The processing circuit is configured to perform the method in any one of the foregoing aspects.

According to a thirteenth aspect, an embodiment of this application provides a system. The system includes a terminal device and a network device, the terminal device is configured to perform the methods performed by the terminal device in the first aspect and the third aspect, and the network device is configured to perform the methods performed by the network device in the second aspect and the fourth aspect.

BRIEF DESCRIPTION OF DRAWINGS

To describe technical solutions in embodiments of this application or in the background more clearly, the following describes the accompanying drawings used in embodiments of this application or in the background.

DESCRIPTION OF EMBODIMENTS

The following describes embodiments of this application with reference to the accompanying drawings in embodiments of this application.

Figure 1:
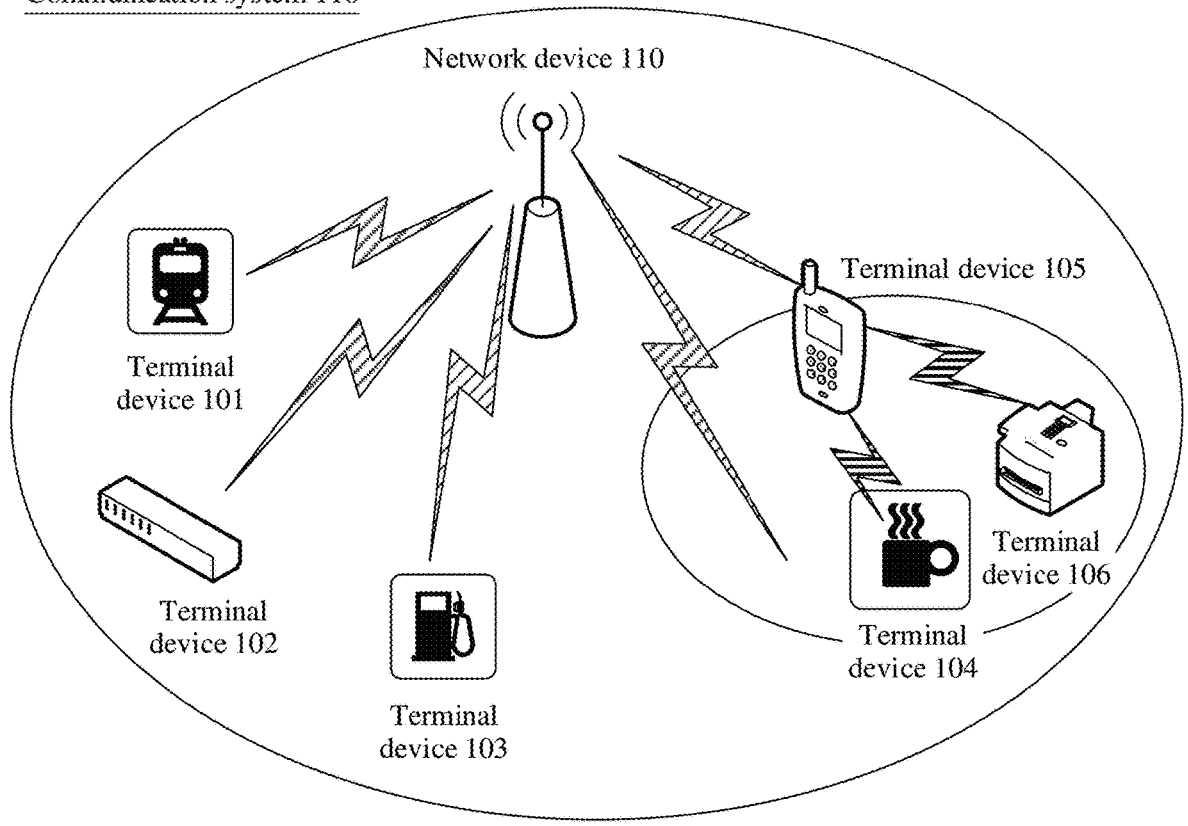
FIG. 1 is a schematic diagram of an architecture of a communication system according to an embodiment of this application.

FIG. 1 is a schematic diagram of an architecture of a communication system 100 according to an embodiment of this application. The communication system 100 may include a network device 110 and terminal devices 101 to 106. It should be understood that the communication system 100 to which a method in embodiments of this application may be applied may include more or fewer network devices or terminal devices. The network device or the terminal device may be hardware, or may be software classified in terms of functions, or a combination thereof. The network device may communicate with the terminal device by using another device or a network element. In the communication system 100, the network device 110 may send downlink data to the terminal devices 101 to 106. Certainly, the terminal devices 101 to 106 may also send uplink data to the network device 110. The terminal devices 101 to 106 each may be a cellular phone, a smartphone, a portable computer, a handheld communication device, a handheld computing device, a satellite radio apparatus, a global positioning system, a personal digital assistant (PDA), any other suitable device for communication on the wireless communication system 100, or the like. The communication system 100 may use a public land mobile network (PLMN), a device-to-device (D2D) network, a machine to machine (M2M) network, an internet of things (IoT), or another network. In addition, the terminal devices 104 to 106 may also form a communication system. In this communication system, the terminal device 105 may send downlink data to the terminal device 104 or the terminal device 106. The method in embodiments of this application may be applied to the communication system 100 shown in FIG. 1.

The following describes nouns in this application:

(1) Discontinuous Reception (DRX) Mechanism

Figure 2:
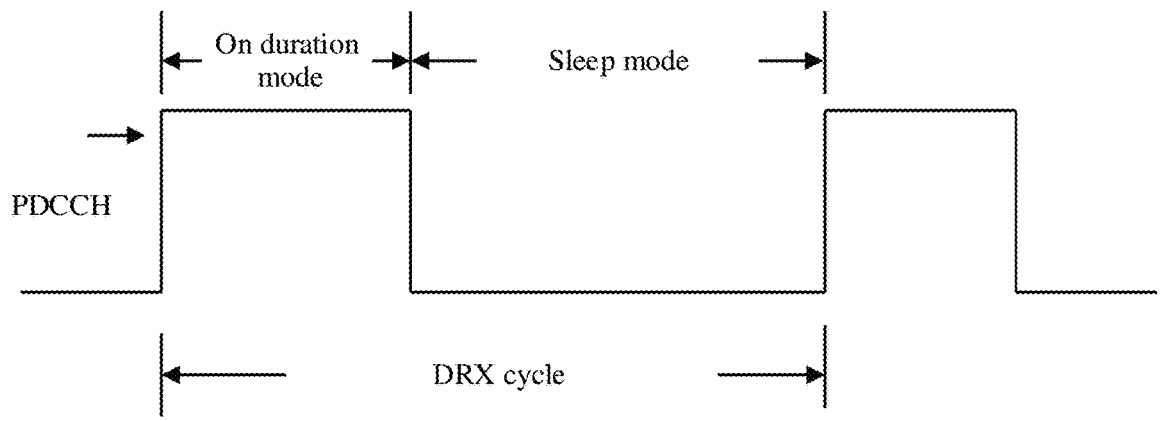
FIG. 2 is a schematic diagram of a DRX mechanism according to an embodiment of this application.

In an LTE system, the DRX mechanism is designed in 3GPP to reduce power consumption of UE in a connected mode. Main features of the DRX mechanism are as follows:

FIG. 2 is a schematic diagram of a DRX mechanism according to an embodiment of this application. In an active state of an RRC connected mode, the UE starts an inactive timer, and the UE continuously attempts to receive a downlink control channel (e.g. physical downlink control channel (PDCCH)). If the UE receives scheduled downlink control information (DCI) on the PDCCH, the UE restarts the inactive timer. If the UE does not receive DCI within a period of time and the inactive timer expires, the UE enters a DRX state. In the DRX state, a basic time unit is a DRX cycle, and a length of the DRX cycle is referred to as a DRX cycle. A DRX cycle includes a sleep mode and an on duration mode (on duration). Sleep mode: The UE in the sleep mode may completely shut down communication devices such as a receiver and a baseband processor, to reduce power consumption. On duration mode: When the DRX cycle enters the on duration mode, the UE is woken up and listens to the PDCCH. Once receiving DCI on the PDCCH, the UE restarts the inactive timer. If the UE does not receive any DCI during the on duration mode and the on duration mode ends, or if the UE receives DCI but the inactive timer expires, the UE returns to the sleep mode again.

It should be noted that, usually, the UE is not woken up only when the on duration mode arrives, but is first woken up in one or more LTE slots before the on duration mode arrives, and receives a downlink reference signal, to perform time and frequency synchronization, thereby avoiding an error that is between a clock and a working frequency of the system and a clock and a frequency domain of a base station and that is caused by long-time sleep of the UE. In addition, the UE may also first attempt to receive a downlink synchronization signal and update a system message, to prevent a system message error after the UE moves from one cell to another cell.

(2) Wake-Up Signal

The wake-up signal is a control signal introduced to a narrow band internet of things (NB-IoT). The wake-up signal mainly used in a paging mechanism in an idle state to reduce power consumption of the UE.

In an RRC idle state, the UE is usually in a sleep state, but the UE is woken up at intervals to attempt to receive a paging message. A time at which the UE is woken up to receive the PDCCH for scheduling the paging message is referred to as a paging occasion (PO). In an actual system, the base station does not send, on every PO to the UE, the PDCCH for scheduling the paging message, and that the UE is woken up on the PO in most time to receive the PDCCH is an invalid operation, and power consumption of the UE increases. Therefore, a wake-up signal is introduced to the NB-IoT system. If the base station sends, to the UE on a particular PO, the PDCCH for scheduling a paging message, the base station sends the wake-up signal before the PO arrives. Otherwise, the base station does not send the wake-up signal. The UE attempts to receive the wake-up signal within a time before the PO arrives. Once receiving the wake-up signal, the UE confirms that a paging message exists on a subsequent PO, and the UE attempts to receive the PDCCH for scheduling the paging message. If the UE does not receive the wake-up signal, the UE considers that there is no paging message on the subsequent PO, and the UE continues to sleep. Because power consumption and complexity of receiving the wake-up signal are far less than power consumption and complexity of attempting to receive the PDCCH for scheduling the paging message, and a probability of sending the PDCCH for scheduling the paging message in the idle state is not high, power consumption of the UE can be greatly reduced by the wake-up signal.

NR plans to introduce a function of a PDCCH based wake-up signal to power saving features of Release 16, and the UE works in a DRX state. When an NR system is in a connected mode and the base station does not perform scheduling, the UE enters the DRX state to reduce power consumption. The UE attempts to blindly detect DCI in the on duration mode. If no DCI is detected, the UE returns to sleep mode again after the on duration mode ends. If the UE detects DCI (for example, scheduled PDSCH data) during the on duration mode, the UE restarts the inactive timer after transmission of the scheduled PDSCH data ends, and returns to the sleep mode after the inactive timer expires. Therefore, the UE mainly relies on the sleep mode to reduce power consumption.

Considering that the UE needs to continuously attempt to perform blind detection during the on duration mode, to determine whether there is DCI sent to the UE, but in the NR system, the UE may be configured with a plurality of different types of PDCCHs, and DCI sent to the UE does not exist in the on duration mode in most cases, the foregoing blind detection operation actually consumes a large amount of power of the UE.

A sending condition of a PDCCH based wake-up signal (also referred to as a PDCCH-WUS) needs to meet the following conditions: First, the UE is in a sleep mode in a search space of a PDCCH, and the wake-up signal is sent in a period of time before the on duration mode arrives. Second, during the subsequent on duration mode, there is a PDCCH sent to the current UE. In other words, the base station sends the PDCCH-WUS only when the UE needs to be scheduled to send data or receive data and the PDCCH is sent during the on duration mode. Otherwise, the base station does not send the PDCCH-WUS.

Figure 3:
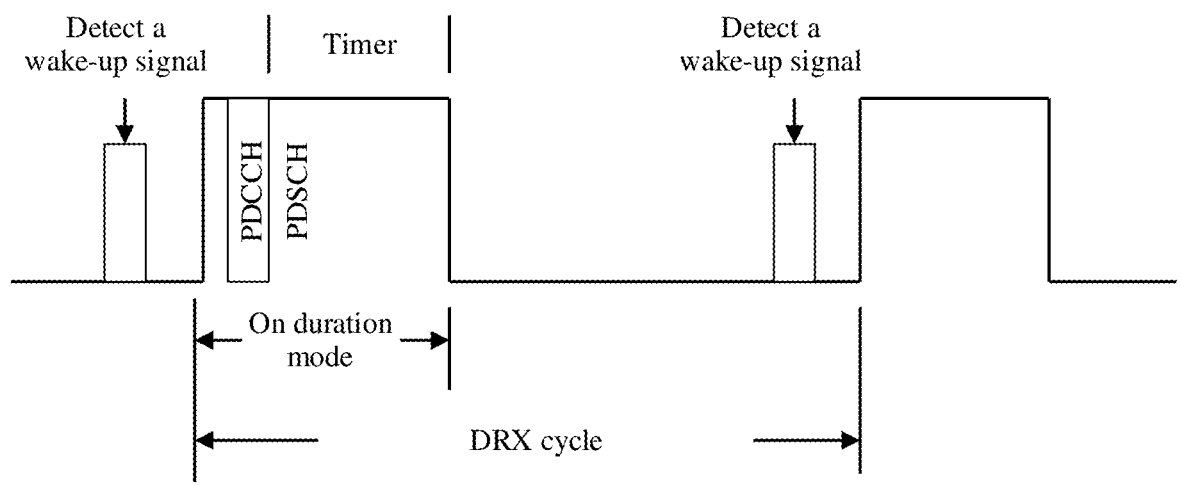
FIG. 3 is a schematic diagram of working of a wake-up signal according to an embodiment of this application.

FIG. 3 is a schematic diagram of working of a wake-up signal according to an embodiment of this application. Before the on duration mode in a DRX cycle arrives, if the base station configures the PDCCH-WUS, the UE may detect, on a frequency domain resource (for example, a search space) in a fixed period of time, the wake-up signal sent by using the PDCCH. If the UE detects the wake-up signal, it indicates that there is data scheduling for the UE in the on duration mode corresponding to the search space (or the wake-up signal). The UE needs to be woken up to detect scheduled DCI during the on duration mode, and sends data or receives data according to an indication of the DCI. If the UE does not detect the wake-up signal in the search space, the UE may consider that there is no data scheduling for the UE during the on duration mode corresponding to the search space, and the UE may not detect DCI or the like, to reduce power consumption.

(3) Paging Mechanism

In an idle state (e.g. RRC_IDLE) or an inactive state (e.g. RRC_INACTIVE), the UE usually shuts down a receiver and is in a lower power consumption state. The base station sends a paging message to the UE, and the UE is woken up from the low power consumption mode at intervals and attempts to receive the paging, so that the UE is woken up.

The paging message mainly includes, for example, a system message change notification and a short message warning of a tsunami or the like.

A specific time at which the UE receives the paging message is determined by using a paging frame (PF) and a paging occasion (PO). The PF indicates a frame for sending paging. That is, the UE in the RRC_IDLE state or the RRC_INACTIVE state attempts to receive paging only in the PF. The PO indicates an occasion of an attempt to receive paging within one PF. Because the paging message is actually scheduled by using DCI scrambled by a paging-radio network temporary identity (P-RNTI), one PO actually corresponds to S detection occasions of the DCI scrambled by the P-RNTI, and S may be obtained by using a quantity of system messages. PF is defined according to the following formula:

(SFN+PF_offset)mod $T$=($T$ div $N$)*(UE_ID mod $N$)

SFN is a system frame number; PF_offset is a frame offset of the PF; T is a DRX period, a time unit, and it may be understood that the UE may have one or more opportunities to attempt to receive paging within a time T; N is a quantity of PFs included in each DRX cycle; and UE_ID is a UE identity and may be 5G-S-TMSI mod 1024 or an inactive radio network temporary identity (I-RNTI).

When one SFN satisfies the foregoing formula, the SFN is considered as a PF, and the UE attempts to receive paging in the PF. One PF may correspond to a plurality of POs. It should be noted that the base station does not send a paging message to the UE on each PO, and the UE detects DCI on the PO to determine whether the base station sends a paging message.

It should be noted that, before the UE is woken up in an idle state and attempts to receive the paging message, some parameters of the receiver need to be first adjusted, to ensure receiving performance. The to-be-adjusted parameters mainly include:

time frequency tracking, also referred to as time and frequency synchronization. Due to limited manufacturing costs of the UE, precision of a used frequency generation crystal oscillator is not particularly high. As a result, after the UE runs for a period of time after power-on, an error occurs between time and a working frequency that are maintained by the UE and a clock and a frequency of the network. Therefore, the base station needs to send a specific reference signal for the UE to estimate a current timing error, a frequency domain error, a delay spread, and a Doppler spread between the UE and the base station, and compensate for the time and frequency error of the UE. In an idle state, the UE usually performs preliminary time frequency tracking by receiving a synchronization signal block (SSB). In a connected mode, the UE may perform fine time frequency tracking by further receiving a channel state information reference signal for tracking (CSI-RS), also referred to as a tracking reference signal (TRS). Automatic gain control (AGC) mainly aims to adjust signal output power of a baseband and a radio frequency circuit based on power of a received signal. In the idle state, the UE also usually performs AGC estimation by receiving an SSB. In addition to the foregoing operations, the UE may further need to perform operations such as signal-to-interference ratio (SIR) estimation and beam measurement.

(4) Channel State Information Reference Signal (CSI-RS).

More reference signals are configured for the UE in the idle state or the inactive state, so that more measurement occasions can be provided for the UE, to reduce a wake-up time of the UE, and reduce power consumption of the UE. UE in an idle state or an inactive state and UE in an RRC connected mode simultaneously exist in a cell, and the base station configures a reference signal (for example, a TRS/CSI-RS) other than an SSB for the UE in the RRC connected mode. Therefore, the reference signal configured for the UE in the RRC connected mode may also be configured for the UE in the idle state or the inactive state. In this way, the UE in the idle state or the inactive state can perform AGC adjustment, time frequency tracking, beam selection, radio resource management (RRM), and the like by using the reference signals, to reduce power consumption of the UE. In addition, these signals are configured for the UE in the RRC connected mode, and are reference signals that already exist in the cell, and the base station does not specifically configure additional reference signals for the UE in the idle state or the inactive state. Therefore, signal addition in the system is also avoided.

However, the reference signals of the RRC connected mode that are configured by the base station for the UE in the idle state or the inactive state may be configured for a plurality of UEs in the RRC connected mode. For different UEs in the RRC connected mode, the base station configures reference signals independently of each other, that is, the base station configures specific reference signals for the UEs. When some reference signals are no longer needed (for example, related UEs configured with the reference signals exit the RRC connected mode), the base station may release the reference signal, and no longer send the reference signal, to reduce power consumption of the base station. In addition, in a multi-beam system, due to reasons such as UE mobility, different data services of different UEs, different DRX periods, and different time for different UEs to exit the RRC connected mode, the base station sends reference signals to different directions at different moments, and stops sending the reference signal in a direction in which the reference signal does not need to be sent, to reduce power consumption of the base station. It can be learned that, reference signal resources configured in the RRC connected mode are not always available, and available states of RSs in different beam directions also change with time.

Figure 4:
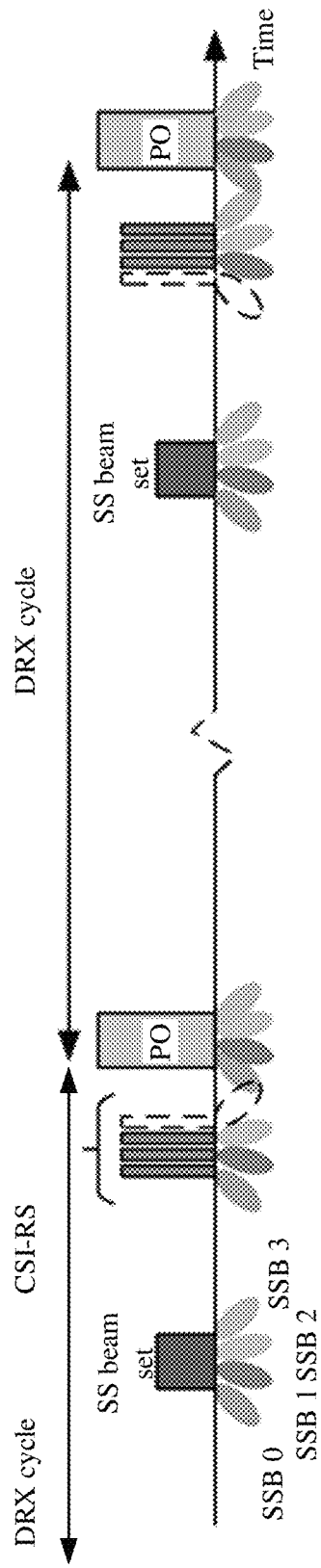
FIG. 4 is a schematic diagram of reference signal transmission according to an embodiment of this application.

FIG. 4 is a schematic diagram of reference signal transmission according to an embodiment of this application. One SS beam set (burst set) includes four actually sent SSBs. Therefore, one paging moment includes four PDCCH listening moments respectively corresponding to the four actually sent SSBs. A CSI-RS resource is configured for UE in an RRC connected mode. As shown in the figure, there are four CSI-RS resources in total, which are respectively in a quasi co-located (QCL) relationship with the four SSBs. In reference signal resources before the first PO, a CSI-RS in the QCL relationship with the SSB 3 is unavailable, and the base station stops sending the reference signal on the resource. In reference signal resources before the second PO, a CSI-RS in the QCL relationship with the SSB 0 is unavailable, and the base station stops sending the reference signal on the resource.

Currently, paging DCI of the NR uses a DCI format 1_0, and the DCI may be used to schedule a paging message carried on a physical downlink shared channel (PDSCH). However, because the base station does not indicate whether the PDSCH carries the paging message, the terminal device needs to perform decoding and parsing on each received PDSCH. This severely wastes power. To resolve the foregoing technical problem, an embodiment of this application provides the following solution.

Figure 5:
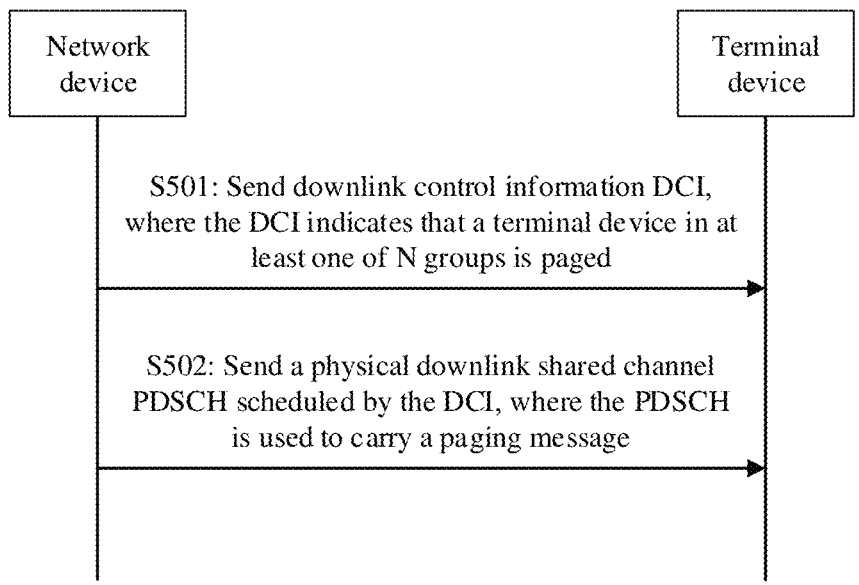
FIG. 5 is a schematic flowchart of a paging indication method according to an embodiment of this application.

FIG. 5 is a schematic flowchart of a paging indication method according to an embodiment of this application. Steps in this embodiment of this application include at least the following steps.

S501: A network device sends downlink control information DCI to M terminal devices, where the M terminal devices correspond to N groups, and the DCI indicates whether a terminal device in at least one of the N groups is paged. Optionally, the DCI further indicates that a terminal device other than the terminal device in the at least one of the N groups is not paged. M is an integer greater than or equal to 1, and N is an integer greater than or equal to 1 and less than or equal to M.

Specifically, the DCI includes first indication information, the first indication information includes N bits, a bit location of an $i^{th}$ bit in the N bits indicates an $i^{th}$ group in the N groups, a bit status of the $i^{th}$ bit indicates whether the terminal device in the $i^{th}$ group is paged, and i is an integer greater than or equal to 1 and less than or equal to N. For example, if 16 terminal devices are grouped into four groups, the DCI sent by a base station includes the first indication information, the first indication information is four bits: 1001, and each bit corresponds to one group, the first bit "1" represents that the terminal device in the first group is paged, the second bit "0" represents that the terminal device in the first group is not paged, the third bit "0" represents that the terminal device in the third group is not paged, and the fourth bit "1" represents that the terminal device in the fourth group is paged. The meanings of the bits 0 and 1 may also be exchanged with each other.

Optionally, the first indication information further includes K bits, the K bits indicate whether a specific channel state information reference signal CSI-RS exists in a first time period, and the first time period includes a discontinuous reception period next to a discontinuous reception period, and K is an integer greater than or equal to 1. After receiving the DCI, the terminal device may determine, based on the first indication information, whether a specific channel state information reference signal CSI-RS exists in a first time period. If the specific channel state information reference signal CSI-RS exists in the first time period, the CSI-RS is received and parsed in a next discontinuous reception period, and AGC adjustment, time frequency tracking, beam selection, or RRM measurement is performed based on the CSI-RS. If the specific channel state information reference signal CSI-RS does not exist in the first time period, the CSI-RS does not need to be received and parsed, to reduce power consumption of the UE. As shown in FIG. 4, only two discontinuous reception periods are drawn. The network device may send the DCI in a first discontinuous reception period, where the DCI indicates whether a specific CSI-RS exists in a second discontinuous reception period. In the figure, no CSI-RS exists on an SSB 0 in the second discontinuous period, but CSI-RSs exist on an SSB 1, an SSB 2, and an SSB 3.

Optionally, the network device may send configuration information to the terminal device, and the terminal device receives the configuration information from the network device. The configuration information indicates that the first indication information further includes the K bits.

Optionally, the configuration information may further include a first configuration parameter or a second configuration parameter. The first configuration parameter indicates a length of preferentially carrying group information in the first indication information, and the second configuration parameter indicates a length of preferentially carrying reference signal information in the first indication information.

For example, the base station configures a parameter X, used to indicate a maximum quantity of groups that the base station expects to indicate, and at the same time, configures a parameter Y, used to indicate a quantity of CSI-RSs in a CSI-RS set or a quantity of CSI-RSs in an SSB direction that the base station expects to indicate. If a total quantity of bits that can carry the first indication information and that are of the DCI is A, and when A bits>(X+Y), if X bits of group information are preferentially carried, the remaining (A−X) bits are used to carry the reference signal information. If Y bits of reference signal information are preferentially carried, the remaining (A| Y) bits are used to carry the group information. The reference signal information indicates whether a specific channel state information reference signal CSI-RS exists in the first time period, and the group information indicates whether the terminal devices in the N groups are paged.

It should be noted that, each terminal device and the network device may determine the N groups based on at least one of identifiers of the M terminal devices and time information, where the time information includes a time at which the DCI is sent or a paging occasion PO to which the DCI belongs. Generating a group identifier based on time information can increase randomness. For example, the UE or the base station may use a value of one or more bits in binary bits of a terminal identity (UE ID) as a group identifier. Alternatively, the UE ID and the time information may be used as an input of a hash function, and an output or a part of the output of the hash function is used as a group identifier. That is, one group identifier corresponds to one or more UE IDs. The UE or the base station may determine the N groups based on the group identifier. Optionally, a core network may allocate one group identifier to the UE, and send a paging message to the base station. The paging message includes the group identifier, one group identifier corresponds to one or more UE IDs, and the UE or the base station determines the N groups based on the group identifier.

Optionally, the DCI may be a DCI format 1_0 used through extension, that is, the DCI is reused. The DCI is not only used to schedule a paging message, but also indicate whether the M terminal devices in the N groups are paged. In this case, the DCI includes second indication information, and the second indication information indicates whether some or all bits in the N bits of the first indication information are carried in a short message field of the DCI. Optionally, the DCI includes third indication information, and the third indication information indicates that the DCI does not include a short message field.

For example, as shown in Table 1, when no system message change (SI change) occurs or there is no public warning system (PWS) indication, a short message indicator field in the DCI indicates 01, indicating that the DCI may be used to schedule a paging message carried by the PDSCH, but not to carry a short message. In this case, an eight-bit short message field in the DCI may be reused to carry the first indication information, or an eight-bit short message field and reserved bits may be used to carry the first indication information, that is, the reused DCI does not include the short message field. Alternatively, when a system message change (SI change) occurs or there is a public warning system (PWS) indication, a short message indicator field in the DCI indicates 11, indicating that the DCI may be used to schedule a paging message carried by the PDSCH, and to carry a short message. In this case, the short message occupies a 2-bit short message field, and the base station may use a remaining 6-bit short message field to carry the first indication information, or may use reserved bits and the remaining 6-bit short message field to jointly carry the first indication information. Considering that sending of the short message is a low probability event, the first indication information may not be sent. Alternatively, when a system message change (SI change) occurs or there is a public warning system (PWS) indication, a short message indicator field in the DCI indicates 10, indicating that the DCI is not used to schedule a paging message. In this case, because there is no paging message, the DCI does not need to carry the first indication information, and the DCI is only used to carry a short message. Alternatively, if the short message indicator field indicates 00, the reserved bits in the DCI may be used to carry the first indication information. The reserved bits are 6 bits.

TABLE 1

| Indicator field | Before reuse | After reuse | Quantity of bits |
| --- | --- | --- | --- |
| 00 | Reserved | | |
| 01 | The DCI includes only scheduling information, and the scheduling information is used to schedule a paging message. | The short message field (8 bits) and the reserved bits (6 bits) are used to carry the first indication information. | 14 bits |
| 10 | The DCI includes only a short message. | The first indication information does not need to be carried. | N/A |
| 11 | The DCI includes scheduling information and a short message. | The reserved bits (6 bits) and the short message field (6 bits not used) are used to carry the first indication information. | 12 bits |

Optionally, the DCI may be independent DCI. The independent DCI is used to carry the first indication information, but is not used to schedule a paging message. The paging message is scheduled by another piece of DCI. The independent DCI does not include a short message indicator field and a short message field. All bits in the independent DCI are used to carry the first indication information. The independent DCI may be scrambled by using a new RNTI, and the DCI scrambled by the PI-RNTI is sent in a search space set and a control resource set (CORESET) that are the same as those of the DCI that schedules the paging message.

Further, the network device may first broadcast, by using a system information block (SIB), that a cell in which the network device is located supports the DCI format 1_0 scrambled by the PI-RNTI. Before sending the DCI, the network device scrambles the DCI by using the new RNTI (for example, the PI-RNTI). When detecting the DCI scrambled by the PI-RNTI, the terminal device performs descrambling by using the PI-RNTI obtained from the broadcast message, to obtain the first indication information.

S502: The network device sends a physical downlink shared channel PDSCH scheduled by the DCI to the terminal device in the at least one group, where the PDSCH is used to carry a paging message. When determining that a terminal device in a group in which the terminal device is located is paged, the terminal device receives a physical downlink shared channel PDSCH scheduled by the DCI from the network device. Optionally, when determining that a terminal device in a group in which the terminal device is located is not paged, the terminal device does not need to decode the received PDSCH.

In this embodiment of this application, the network device indicates, by using the DCI sent to the terminal device, whether the terminal devices in the N groups are paged.

After receiving the DCI, the terminal device may determine, based on the DCI, whether a group in which the terminal device is located is paged. If the group in which the terminal device is located is paged, the PDSCH scheduled by the DCI is received, and is parsed to obtain the paging message. If the group in which the terminal device is located is not paged, the received PDSCH does not need to be decoded to obtain the paging message, to reduce power consumption.

Figure 6:
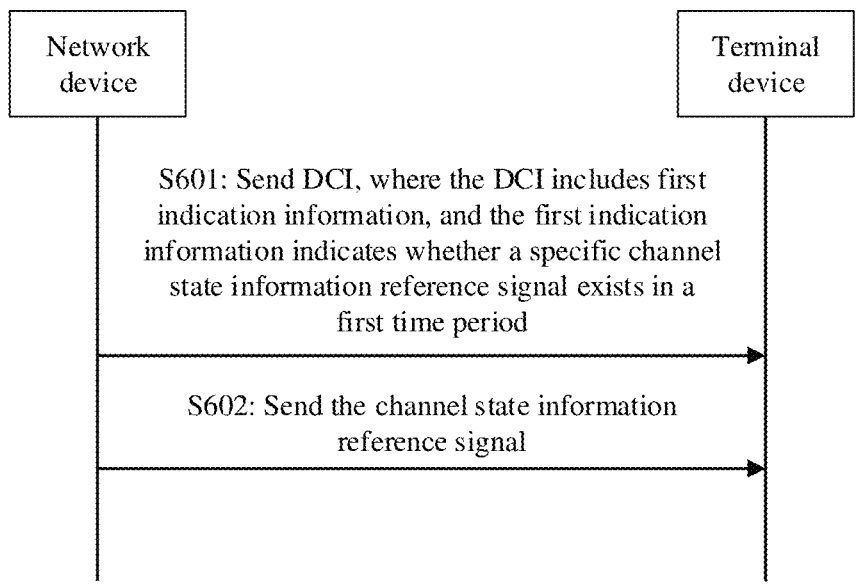
FIG. 6 is a schematic flowchart of a reference signal indication method according to an embodiment of this application.

FIG. 6 is a schematic flowchart of a reference signal indication method according to an embodiment of this application. Steps in this embodiment of this application include at least the following steps.

S601: A network device sends DCI to a terminal device, and the terminal device receives the DCI from the network device, where the DCI includes first indication information, the first indication information indicates whether a specific channel state information reference signal exists in a first time period, and the first time period includes a discontinuous reception period next to a discontinuous reception period.

The specific channel state information reference signal may be a specific channel state information reference signal for one or some cells.

S602: When determining that the specific channel state information reference signal exists in the first time period, the terminal device receives the channel state information reference signal from the network device.

Specifically, after receiving the DCI, the terminal device may determine, based on the first indication information, whether a specific channel state information reference signal CSI-RS exists in the first time period. If the specific channel state information reference signal CSI-RS exists in the first time period, the CSI-RS is received and parsed in a next discontinuous reception period, and AGC adjustment, time frequency tracking, beam selection, or RRM measurement is performed based on the CSI-RS. If the specific channel state information reference signal CSI-RS does not exist in the first time period, the CSI-RS does not need to be received and parsed, to reduce power consumption of the UE. As shown in FIG. 4, only two discontinuous reception periods are drawn. The network device may send the DCI in a first discontinuous reception period, where the DCI indicates whether a specific CSI-RS exists in a second discontinuous reception period. In the figure, no CSI-RS exists on an SSB 0 in the second discontinuous period, but CSI-RSs exist on an SSB 1, an SSB 2, and an SSB 3.

Optionally, the network device may send configuration information to the terminal device, where the configuration information indicates that the DCI is used to carry the first indication information. After receiving the configuration information, the terminal device may determine that the DCI is used to carry the first indication information.

In this embodiment of this application, the network device indicates, by using the DCI, whether the specific channel state information reference signal exists in the first time period. After receiving the DCI, the terminal device may determine whether the specific channel state information reference signal exists in the first time period. If the specific channel state information reference signal exists in the first time period, the CSI-RS is received and parsed in the next discontinuous reception period. If the CSI-RS does not exist in the first time period, the CSI-RS does not need to be received and parsed, to reduce power consumption.

The foregoing describes, in detail, the methods in embodiments of this application. The following provides apparatuses in embodiments of this application.

Figure 7:
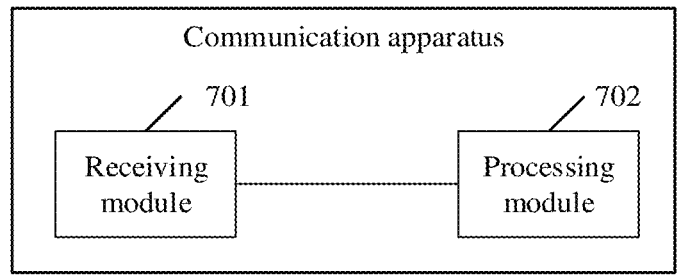
FIG. 7 is a schematic diagram of a structure of a communication apparatus according to an embodiment of this application.

FIG. 7 is a schematic diagram of a structure of a communication apparatus according to an embodiment of this application. The communication apparatus may be a terminal device, or a chip in the terminal device, or a processing system in the terminal device. The communication apparatus may be configured to implement any method and function related to the terminal device in any of the foregoing embodiments. The communication apparatus may include a receiving module 701 and a processing module 702. Optionally, the receiving module 701 may correspond to a radio frequency circuit and a baseband circuit that are included in the terminal device. Detailed descriptions of the modules are as follows:

The receiving module 701 is configured to receive downlink control information DCI from a network device, where the DCI indicates whether M terminal devices in N groups are paged, M is an integer greater than or equal to 1, and N is an integer greater than or equal to 1 and less than or equal to M.

The receiving module 701 is further configured to receive a physical downlink shared channel PDSCH scheduled by the DCI from the network device when determining that a terminal device in a group in which the terminal device is located is paged, where the PDSCH is used to carry a paging message.

Optionally, the DCI includes first indication information, the first indication information includes N bits, a bit location of an $i^{th}$ bit in the N bits indicates an $i^{th}$ group in the N groups, a bit status of the $i^{th}$ bit indicates whether the terminal device in the $i^{th}$ group is paged, and i is an integer greater than or equal to 1 and less than or equal to N.

Optionally, the DCI includes second indication information, and the second indication information indicates whether some or all of the N bits of the first indication information are carried in a short message field of the DCI.

Optionally, the DCI includes third indication information, and the third indication information indicates that the DCI does not include a short message field.

Optionally, the processing module 702 is configured to determine the N groups based on at least one of identifiers of the M terminal devices and time information, where the time information includes a time at which the DCI is sent or a paging occasion PO to which the DCI belongs.

Optionally, the first indication information further includes K bits, the K bits indicate whether a specific channel state information reference signal CSI-RS exists in a first time period, and the first time period includes a discontinuous reception period next to a discontinuous reception period, and K is an integer greater than or equal to 1.

Optionally, the receiving module 701 is further configured to receive configuration information from the network device, where the configuration information indicates that the first indication information further includes the K bits.

It should be noted that, for implementation of each module, correspondingly, reference may be further made to corresponding descriptions of the method embodiments shown in FIG. 5 and FIG. 6, to perform the method and the function performed by the terminal device in the foregoing embodiments.

Figure 8:
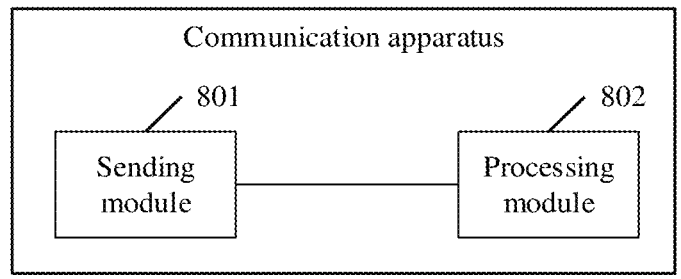
FIG. 8 is a schematic diagram of a structure of another communication apparatus according to an embodiment of this application.

FIG. 8 is a schematic diagram of a structure of another communication apparatus according to an embodiment of this application. The communication apparatus may be a network device, or a chip in the network device, or a processing system in the network device. The communication apparatus may be configured to implement any method and function related to the network device in any of the foregoing embodiments. The apparatus may include a sending module 801 and a processing module 802. Optionally, the sending module 801 may correspond to a radio frequency circuit and a baseband circuit that are included in the terminal device. Detailed descriptions of the modules are as follows:

The sending module 801 is configured to send downlink control information DCI to M terminal devices, where the M terminal devices correspond to N groups, the DCI indicates whether a terminal device in at least one of the N groups is paged, M is an integer greater than or equal to 1, and N is an integer greater than or equal to 1 and less than or equal to M.

The sending module 801 is further configured to send a physical downlink shared channel PDSCH scheduled by the DCI to the terminal device in the at least one group, where the PDSCH is used to carry a paging message.

Optionally, the DCI indicates that a terminal device other than the terminal device in the at least one of the N groups is not paged.

Optionally, the DCI includes first indication information, the first indication information includes N bits, a bit location of an $i^{th}$ bit in the N bits indicates an $i^{th}$ group in the N groups, a bit status of the $i^{th}$ bit indicates whether the terminal device in the $i^{th}$ group is paged, and i is an integer greater than or equal to 1 and less than or equal to N.

Optionally, the DCI includes second indication information, and the second indication information indicates whether some or all of the N bits of the first indication information are carried in a short message field of the DCI.

Optionally, the DCI includes third indication information, and the third indication information indicates that the DCI does not include a short message field.

Optionally, the processing module 802 is configured to determine the N groups based on at least one of identifiers of the M terminal devices and time information, where the time information includes a time at which the DCI is sent or a paging occasion PO to which the DCI belongs.

Optionally, the first indication information further includes K bits, the K bits indicate whether a specific channel state information reference signal CSI-RS exists in a first time period, and the first time period includes a discontinuous reception period next to a discontinuous reception period, and K is an integer greater than or equal to 1.

Optionally, the sending module 801 is further configured to send configuration information to the M terminal devices, where the configuration information indicates that the first indication information further includes the K bits.

It should be noted that, for implementation of each module, correspondingly, reference may be further made to corresponding descriptions of the method embodiments shown in FIG. 5 and FIG. 6, to perform the method and the function performed by the network device in the foregoing embodiments.

Figure 9:
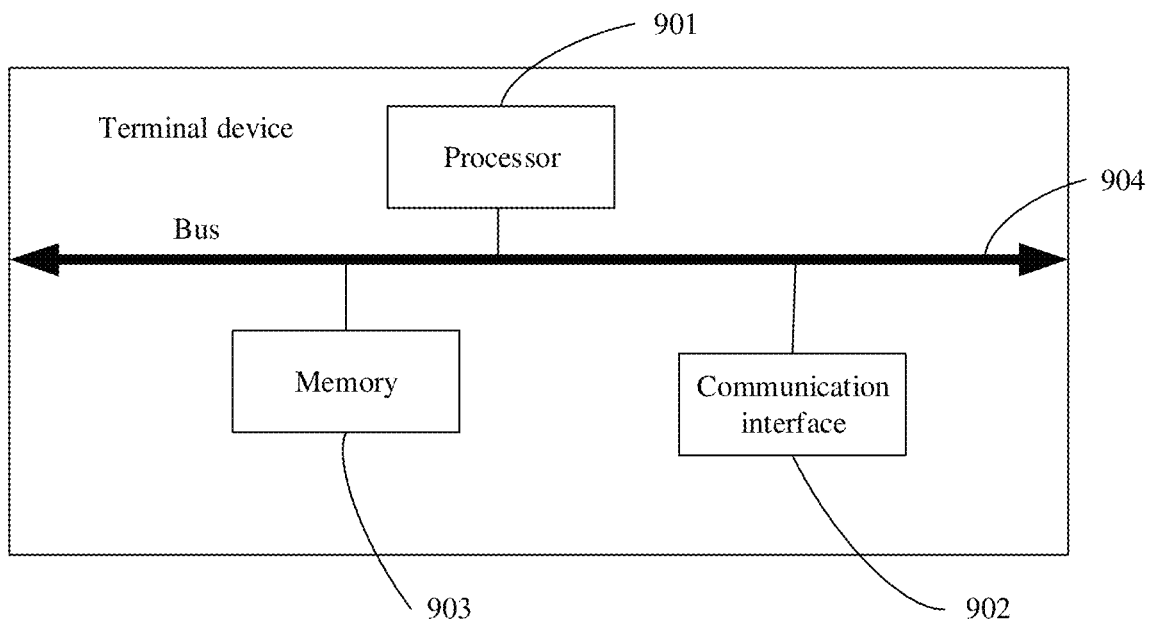
FIG. 9 is a schematic diagram of a structure of a terminal device according to an embodiment of this application.

Continue to refer to FIG. 9. FIG. 9 is a schematic diagram of a structure of a terminal device according to an embodiment of this application. As shown in FIG. 9, the terminal device may include: at least one processor 901, at least one communication interface 902, at least one memory 903, and at least one communication bus 904.

The processor 901 may be a central processing unit, a general-purpose processor, a digital signal processor, an application-specific integrated circuit, a field programmable gate array or another programmable logic device, a transistor logic device, a hardware component, or any combination thereof. The processor 901 may implement or execute logical blocks, modules, and circuits in various examples described with reference to content disclosed in this application. The processor may alternatively be a combination for implementing a computing function, for example, a combination including one or more microprocessors, or a combination of a digital signal processor and a microprocessor. The communication bus 904 may be a peripheral component interconnect standard PCI bus, an extended industry standard architecture EISA bus, or the like. The bus may be classified into an address bus, a data bus, a control bus, and the like. For ease of representation, only one thick line is used to represent the bus in FIG. 9, but this does not mean that there is only one bus or only one type of bus. The communication bus 904 is configured to implement connection and communication between these components. The communication interface 902 of the device in this embodiment of this application is configured to perform signaling or data communication with another node device. The memory 903 may be a volatile memory, for example, a nonvolatile dynamic random access memory (NVRAM), a phase change random access memory (PRAM), or a magnetoresistive random access memory (MRAM), or may be a nonvolatile memory, for example, at least one magnetic disk storage device, an electronically erasable programmable read-only memory (EEPROM), a flash memory device such as a NOR flash memory or a NAND flash memory, or a semiconductor device such as a solid state disk (SSD). Optionally, the memory 903 may be at least one storage apparatus that is located far away from the processor 901. Optionally, the memory 903 may further store a group of program code. Optionally, the processor 901 may further execute a program stored in the memory 903.

Downlink control information DCI from a network device is received, where the DCI indicates whether M terminal devices in N groups are paged, M is an integer greater than or equal to 1, and N is an integer greater than or equal to 1 and less than or equal to M.

When it is determined that a terminal device in a group in which the terminal device is located is paged, a physical downlink shared channel PDSCH scheduled by the DCI from the network device is received, where the PDSCH is used to carry a paging message.

Optionally, the DCI includes first indication information, the first indication information includes N bits, a bit location of an $i^{th}$ bit in the N bits indicates an $i^{th}$ group in the N groups, a bit status of the $i^{th}$ bit indicates whether the terminal device in the $i^{th}$ group is paged, and i is an integer greater than or equal to 1 and less than or equal to N.

Optionally, the DCI includes second indication information, and the second indication information indicates whether some or all of the N bits of the first indication information are carried in a short message field of the DCI.

Optionally, the DCI includes third indication information, and the third indication information indicates that the DCI does not include a short message field.

Optionally, the processor 901 is further configured to perform the following operation step:

determining the N groups based on at least one of identifiers of the M terminal devices and time information, where the time information includes a time at which the DCI is sent or a paging occasion PO to which the DCI belongs.

Optionally, the first indication information further includes K bits, the K bits indicate whether a specific channel state information reference signal CSI-RS exists in a first time period, and the first time period includes a discontinuous reception period next to a discontinuous reception period, and K is an integer greater than or equal to 1.

Optionally, the processor 901 is further configured to perform the following operation step:

receiving configuration information from the network device, where the configuration information indicates that the first indication information further includes the K bits.

Further, the processor may also cooperate with the memory and the communication interface, to perform operations of the terminal device in the foregoing embodiments of this application.

Figure 10:
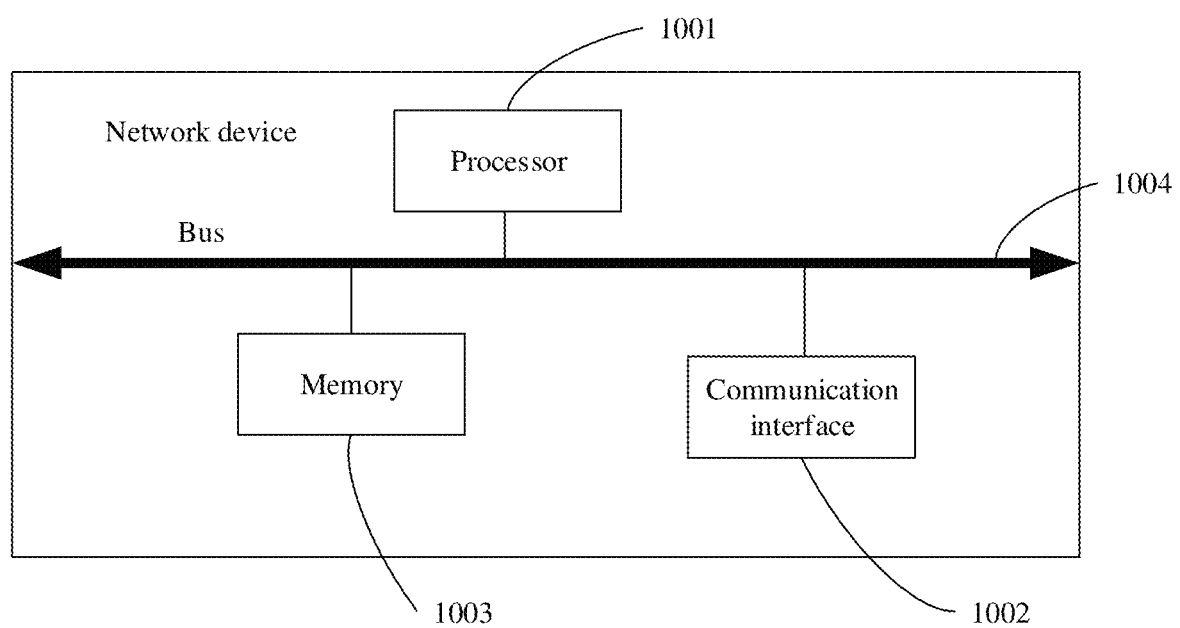
FIG. 10 is a schematic diagram of a structure of a network device according to an embodiment of this application.

Continue to refer to FIG. 10. FIG. 10 is a schematic diagram of a structure of a network device according to an embodiment of this application. As shown in the figure, the network device may include: at least one processor 1001, at least one communication interface 1002, at least one memory 1003, and at least one communication bus 1004.

The processor 1001 may be a processor of various types mentioned above. The communication bus 1004 may be a peripheral component interconnect standard PCI bus, an extended industry standard architecture EISA bus, or the like. The bus may be classified into an address bus, a data bus, a control bus, and the like. For ease of representation, only one thick line is used to represent the bus in FIG. 10, but this does not mean that there is only one bus or only one type of bus. The communication bus 1004 is configured to implement connection and communication between these components. The communication interface 1002 of the device in this embodiment of this application is configured to perform signaling or data communication with another node device. The memory 1003 may be a processor of various types mentioned above. Optionally, the memory 1003 may be at least one storage apparatus that is located far away from the processor 1001. The memory 1003 stores a group of program code, and the processor 1001 executes a program in the memory 1003.

Downlink control information DCI is sent to M terminal devices, where the M terminal devices correspond to N groups, the DCI indicates whether a terminal device in at least one of the N groups is paged, M is an integer greater than or equal to 1, and N is an integer greater than or equal to 1 and less than or equal to M.

A physical downlink shared channel PDSCH scheduled by the DCI is sent to the terminal device in the at least one group, where the PDSCH is used to carry a paging message.

Optionally, the DCI indicates that a terminal device other than the terminal device in the at least one of the N groups is not paged.

Optionally, the DCI includes first indication information, the first indication information includes N bits, a bit location of an $i^{th}$ bit in the N bits indicates an $i^{th}$ group in the N groups, a bit status of the $i^{th}$ bit indicates whether the terminal device in the $i^{th}$ group is paged, and i is an integer greater than or equal to 1 and less than or equal to N.

Optionally, the DCI includes second indication information, and the second indication information indicates whether some or all of the N bits of the first indication information are carried in a short message field of the DCI.

Optionally, the DCI includes third indication information, and the third indication information indicates that the DCI does not include a short message field.

Optionally, the processor 901 is further configured to perform the following operation step:

determining the N groups based on at least one of identifiers of the M terminal devices and time information, where the time information includes a time at which the DCI is sent or a paging occasion PO to which the DCI belongs.

Optionally, the first indication information further includes K bits, the K bits indicate whether a specific channel state information reference signal CSI-RS exists in a first time period, and the first time period includes a discontinuous reception period next to a discontinuous reception period, and K is an integer greater than or equal to 1.

Optionally, the processor 901 is further configured to perform the following operation step:

sending configuration information to the M terminal devices, where the configuration information indicates that the first indication information further includes the K bits.

Further, the processor may also cooperate with the memory and the communication interface, to perform operations of the network device in the foregoing embodiments of this application.

An embodiment of this application further provides a chip system. The chip system includes a processor, configured to support a terminal device or a network device in implementing a function in any one of the foregoing embodiments, for example, sending or receiving the foregoing DCI. In a possible design, the chip system may further include a memory. The memory is configured to store necessary program instructions and data of the terminal device or the network device. The chip system may include a chip, or may include a chip and another discrete component.

An embodiment of this application further provides a processor, configured to: couple to a memory, and perform any method and function related to the terminal device or the network device in any one of the foregoing embodiments.

An embodiment of this application further provides a computer program product including instructions. When the computer program product is run on a computer, the computer is enabled to perform any method and function related to a terminal device or a network device in any one of the foregoing embodiments.

An embodiment of this application further provides an apparatus, configured to perform any method and function related to a terminal device or a network device in any one of the foregoing embodiments.

An embodiment of this application further provides a wireless communication system. The system includes at least one terminal device and at least one network device in any one of the foregoing embodiments.

All or some of the foregoing embodiments may be implemented through software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk solid state disk (SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application.

What is claimed is:

1. A paging indication method, wherein the method comprises:

receiving, by a terminal device, downlink control information (DCI) from a network device, wherein
the DCI indicates whether M terminal devices in N groups are paged,
the terminal device is one of the M terminal devices, and is located in a group among the N groups,
M is an integer greater than or equal to 1, and
N is an integer greater than or equal to 1 and less than or equal to M; and
in response to determining that the group in which the terminal device is located is paged, receiving, by the terminal device, a physical downlink shared channel (PDSCH) scheduled by another piece of DCI from the network device, wherein the PDSCH carries a paging message.

2. The method according to claim 1, wherein
the DCI comprises first indication information,
the first indication information comprises N bits,
a bit location of an $i^{th}$ bit in the N bits indicates an $i^{th}$ group in the N groups,
a bit status of the $i^{th}$ bit indicates whether at least one terminal device in the $i^{th}$ group is paged, and
i is an integer greater than or equal to 1 and less than or equal to N.

3. The method according to claim 2, wherein
the first indication information further comprises K bits,
the K bits indicate whether a specific channel state information reference signal (CSI-RS) exists in a first time period,
the first time period comprises a discontinuous reception period next to another discontinuous reception period, and
K is an integer greater than or equal to 1.

4. The method according to claim 3, wherein the method further comprises:
receiving, by the terminal device, configuration information from the network device, wherein the configuration information indicates that the first indication information further comprises the K bits.

5. The method according to claim 1, wherein the method further comprises:
determining, by the terminal device, the N groups based on at least one of:
identifiers of the M terminal devices, or
time information, wherein the time information comprises a time at which the DCI is sent or a paging occasion (PO) to which the DCI belongs.

6. A paging indication method, comprising:
sending, by a network device, downlink control information (DCI) to M terminal devices, wherein
the M terminal devices correspond to N groups,
the DCI indicates whether a terminal device in at least one group of the N groups is paged,
M is an integer greater than or equal to 1, and
N is an integer greater than or equal to 1 and less than or equal to M; and
sending, by the network device, a physical downlink shared channel (PDSCH) scheduled by another piece of DCI to the terminal device in the at least one group, wherein the PDSCH carries a paging message.

7. The method according to claim 6, wherein
the DCI indicates that a further terminal device other than the terminal device in the at least one group is not paged.

8. The method according to claim 6, wherein
the DCI comprises first indication information,
the first indication information comprises N bits,
a bit location of an $i^{th}$ bit in the N bits indicates an $i^{th}$ group in the N groups,
a bit status of the $i^{th}$ bit indicates whether at least one terminal device in the $i^{th}$ group is paged, and
i is an integer greater than or equal to 1 and less than or equal to N.

9. The method according to claim 8, wherein
the DCI further comprises second indication information, and
the second indication information indicates whether some or all of the N bits of the first indication information are carried in a short message field of the DCI.

10. The method according to claim 8, wherein
the first indication information further comprises K bits,
the K bits indicate whether a specific channel state information reference signal (CSI-RS) exists in a first time period,
the first time period comprises a discontinuous reception period next to another discontinuous reception period, and
K is an integer greater than or equal to 1.

11. The method according to claim 10, wherein the method further comprises:
sending, by the network device, configuration information to the M terminal devices, wherein the configuration information indicates that the first indication information further comprises the K bits.

12. The method according to claim 6, wherein the method further comprises:
determining, by the network device, the N groups based on at least one of:
identifiers of the M terminal devices, or
time information, wherein the time information comprises a time at which the DCI is sent or a paging occasion (PO) to which the DCI belongs.

13. A communication apparatus, comprising:
at least one processor; and
at least memory storing instructions executable by the at least one processor to cause the communication apparatus to perform a method comprising:
receiving downlink control information (DCI) from a network device, wherein
the DCI indicates whether M terminal devices in N groups are paged,
the communication apparatus is one of the M terminal devices, and is located in a group among the N groups,
M is an integer greater than or equal to 1, and
N is an integer greater than or equal to 1 and less than or equal to M; and
in response to determining that the group in which the communication apparatus is located is paged, receiving a physical downlink shared channel (PDSCH) scheduled by another piece of DCI from the network device, wherein the PDSCH carries a paging message.

14. The communication apparatus according to claim 13, wherein
the DCI comprises first indication information,
the first indication information comprises N bits,
a bit location of an $i^{th}$ bit in the N bits indicates an $i^{th}$ group in the N groups,
a bit status of the $i^{th}$ bit indicates whether at least one terminal device in the ith group is paged, and
i is an integer greater than or equal to 1 and less than or equal to N.

15. The communication apparatus according to claim 14, wherein
the first indication information further comprises K bits,
the K bits indicate whether a specific channel state information reference signal (CSI-RS) exists in a first time period,
the first time period comprises a discontinuous reception period next to another discontinuous reception period, and
K is an integer greater than or equal to 1.

16. The communication apparatus according to claim 15, wherein the method further comprises:
receiving configuration information from the network device, wherein the configuration information indicates that the first indication information further comprises the K bits.

17. The communication apparatus according to claim 13, wherein the method further comprises:
determining the N groups based on at least one of:
identifiers of the M terminal devices, or
time information, wherein the time information comprises a time at which the DCI is sent or a paging occasion (PO) to which the DCI belongs.

18. A communication apparatus, comprising:
at least one processor; and
at least memory storing instructions; executable by the at least one processor to cause the communication apparatus to perform a method comprising:
sending downlink control information (DCI) to M terminal devices, wherein
the M terminal devices correspond to N groups,
the DCI indicates whether a terminal device in at least one group of the N groups is paged, M is an integer greater than or equal to 1, and N is an integer greater than or equal to 1 and less than or equal to M; and sending a physical downlink shared channel (PDSCH) scheduled by another piece of DCI to the terminal device in the at least one group, wherein the PDSCH carries-is used to carry a paging message.

19. The communication apparatus according to claim 18, wherein the DCI comprises first indication information, the first indication information comprises N bits, a bit location of an $i^{th}$ bit in the N bits indicates an $i^{th}$ group in the N groups, a bit status of the ith bit indicates whether at least one terminal device in the $i^{th}$ group is paged, and i is an integer greater than or equal to 1 and less than or equal to N.

20. The communication apparatus according to claim 19, wherein the first indication information further comprises K bits, the K bits indicate whether a specific channel state information reference signal (CSI-RS) exists in a first time period, the first time period comprises a discontinuous reception period next to another discontinuous reception period, and K is an integer greater than or equal to 1.

* * * * *